(12) United States Patent
Zhu et al.

(10) Patent No.: US 7,978,848 B2
(45) Date of Patent: Jul. 12, 2011

(54) CONTENT ENCRYPTION SCHEMA FOR INTEGRATING DIGITAL RIGHTS MANAGEMENT WITH ENCRYPTED MULTICAST

(75) Inventors: Bin Zhu, Edina, MN (US); Min Feng, Sichuan (CN)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 11/621,445

(22) Filed: Jan. 9, 2007

(65) Prior Publication Data

US 2008/0165956 A1 Jul. 10, 2008

(51) Int. Cl.
*H04L 9/00* (2006.01)
(52) U.S. Cl. ............................. 380/44; 708/200; 708/491
(58) Field of Classification Search .................... 380/44; 708/200, 491
See application file for complete search history.

(56) References Cited

U.S. PATENT DOCUMENTS

| 4,351,982 | A | | 9/1982 | Miller et al. |
| 5,617,453 | A | * | 4/1997 | Roobrouck .................... 375/367 |
| 5,748,736 | A | * | 5/1998 | Mittra ............................ 713/163 |
| 6,088,453 | A | | 7/2000 | Shimbo |
| 6,275,586 | B1 | * | 8/2001 | Kelly .............................. 380/46 |
| 6,788,788 | B1 | * | 9/2004 | Kasahara et al. .............. 380/277 |
| 6,959,090 | B1 | | 10/2005 | Alve et al. |
| 7,039,803 | B2 | | 5/2006 | Lotspiech et al. |
| 7,039,938 | B2 | | 5/2006 | Candelore |
| 7,120,250 | B2 | | 10/2006 | Candelore |
| 2002/0069420 | A1 | | 6/2002 | Russell et al. |
| 2002/0186837 | A1 | * | 12/2002 | Hopkins et al. ................. 380/28 |
| 2003/0021439 | A1 | * | 1/2003 | Lubin et al. .................... 382/100 |
| 2003/0198351 | A1 | | 10/2003 | Foster et al. |
| 2004/0028223 | A1 | * | 2/2004 | Joye et al. ......................... 380/30 |
| 2004/0123156 | A1 | * | 6/2004 | Hammond et al. ............. 713/201 |
| 2005/0063539 | A1 | * | 3/2005 | Langin-Hooper et al. ...... 380/44 |
| 2005/0080746 | A1 | * | 4/2005 | Zhu et al. ......................... 705/59 |
| 2005/0100167 | A1 | | 5/2005 | Alve et al. |
| 2005/0132209 | A1 | * | 6/2005 | Hug et al. ...................... 713/189 |

(Continued)

FOREIGN PATENT DOCUMENTS

JP 2003005638 A 8/2003

(Continued)

OTHER PUBLICATIONS

PCT International Search Report and Written Opinion for International Application No. PCT/US2008/050649, mailed on Feb. 6, 2009, 14 pgs.

(Continued)

*Primary Examiner* — Jeffrey D Popham
*Assistant Examiner* — Sunita Reddy
(74) *Attorney, Agent, or Firm* — Lee & Hayes, PLLC

(57) ABSTRACT

Systems and methods provide a content encryption schema for integrating digital rights management (DRM) in a multicast/broadcast encryption system. In one implementation, an exemplary integrated key schema provides content encryption keys that can be employed by a multicast or broadcast process, while providing DRM protection of recorded multicast content via a single DRM decryption secret. The integrated key schema provides high security and allows encrypted multicast content to be saved directly to local files. A license server can efficiently manage and generate DRM keys to be delivered to clients because only a single key needs to be delivered per license to a client. The integrated key schema can be applied together with conventional broadcast or multicast encryption techniques.

20 Claims, 5 Drawing Sheets

U.S. PATENT DOCUMENTS

| | | | |
|---|---|---|---|
| 2006/0010500 A1 | 1/2006 | Elazar et al. | |
| 2006/0050701 A1 | 3/2006 | Peterka et al. | |
| 2006/0075455 A1 | 4/2006 | Koch et al. | |
| 2006/0080259 A1* | 4/2006 | Wajs | 705/51 |
| 2006/0109158 A1* | 5/2006 | Ettorre | 341/159 |
| 2006/0123484 A1 | 6/2006 | Babic et al. | |
| 2006/0149678 A1* | 7/2006 | Malvar et al. | 705/50 |
| 2006/0156007 A1* | 7/2006 | Stephens-Doll | 713/176 |
| 2006/0206708 A1 | 9/2006 | Son et al. | |
| 2006/0235800 A1 | 10/2006 | Furlong et al. | |
| 2007/0016663 A1* | 1/2007 | Weis | 709/223 |
| 2008/0172334 A1* | 7/2008 | Jung et al. | 705/50 |

FOREIGN PATENT DOCUMENTS

| | | | |
|---|---|---|---|
| WO | WO2006043651 | A1 | 4/2006 |
| WO | WO2006095989 | A1 | 9/2006 |

OTHER PUBLICATIONS

Gemplus, et al., "PayTV Model", retrieved at <<http://www.3gpp.org/ftp/tsg_sa/WG3_Security/TSGS3_28_Bedlin/Docs/PDF/S3-030257.pdf>>, May 6-9, 2003, pp. 05.

Ramkumar, et al., "A DRM Based on Renewable Broadcast Encryption", available at least as early as <<Nov. 23, 2006>> at <<http://www.cse.msstate.edu/~ramkumar/vcip05.pdf>>, pp. 11.

Ramkumar, "Broadcast Encryption Using Probabilistic Key Distribution and Applications", retrieved at <<http://.cse.msstate.edu/~ramkumar/jcp0103.pdf>>, Journal of Computers, vol. 1, No. 3, Jun. 2006, Academy Publisher, 2006, pp. 1-12.

Suomalainen, "Content Protection and Authorized Sharing for Mobile Broadcast", retrieved at <<http://www.tml.tkk.fi/Studies/T-111.590/2005/students/paper_58881A.pdf>>, Research Seminar on Digital Media, Helsinki University of Technology, May 9, 2005, pp. 16.

* cited by examiner

CONTENT ENCRYPTION SCHEMA FOR INTEGRATING DIGITAL RIGHTS MANAGEMENT WITH ENCRYPTED MULTICAST

BACKGROUND

In many applications it is desirable to save the content received from restricted broadcast or encrypted multicast to local files for subsequent replays. The locally saved files should ideally be protected by a Digital Rights Management (DRM) system to prevent unauthorized usage. It is a great challenge to combine conventional DRM with conventional restricted multicast/broadeast since they use different mechanisms to accomplish different goals, and the conventional mechanisms tend to be mutually exclusive. The access control characteristic of restricted multicast/broadcast is designed to ensure that users not belonging to a premium group are unable to access the privileged content. Thus, a new content encryption key is generated each time there is a change in the group membership. These key changes can even occur in the middle of playing the live content. Access control in restricted multicast/broadcast can be achieved by a key distribution mechanism such that only the parties currently belonging to the premium group can receive the content decryption keys, which are then used to decrypt the encrypted multicast/broadcast content. Thus, key distribution mechanisms that support access control in restricted multicast/broadcast are needed.

In a conventional DRM system, on the other hand, a content object is usually encrypted with a single encryption key to avoid the complexity of key generation and management.

There are at least two conventional straightforward ways to use multicast and DRM together, but both have serious drawbacks. The first straightforward solution, referred to as the direct recording method, saves encryption blocks received via multicast/broadcast directly to local storage. A user needs to acquire a license from a license server to play the saved content. A license according to this conventional technique has to contain all the content encryption keys associated with all the possible combinations of the saved encryption blocks. This means that a license may contain multiple, even a substantial number of content encryption keys. The license server has to store and track all the content encryption keys used in multicast/broadcast in order to deliver necessary keys required for DRM protection across all the users.

The second straightforward solution, referred to as the transcryption technique, works in a similar manner as a transcoder to compression: a recipient transcrypts the encrypted multicast/broadeast content into DRM encrypted content. In this conventional technique, the recipient first decrypts the encrypted multicast content, using multiple content decryption keys, and then re-encrypts the content using DRM encryption, in which a single content encryption key is used for each saved file. In addition to the disadvantage of computational overhead during the transcryption, the security of the system is also compromised. The recipient is required to perform the content packaging that a content publisher normally does in a conventional DRM system. Since users are not trusted in the threat model of DRM applications, more client modules have to be protected against hacking and reverse engineering. In this conventional technique, a conventional DRM content encryption key also needs to be acquired from the license server by the recipient before re-encryption.

Thus, conventional techniques to provide DRM for restricted multicast/broadeast result in some serious drawbacks. DRM as applied to the conventional "direct recording" technique of storing encrypted multicast content introduces the drawback of requiring complex key management and the drawback of sending a cumbersome number of keys per license to a client. DRM as applied to the conventional "transcryption" technique of storing encrypted multicast content into a DRM format necessitates the drawbacks of requiring prior possession of the DRM key, intensive computational overhead, and introducing the user's machine as an essential middleman in what is supposed to be a secure DRM process for managing the digital rights of the same user.

SUMMARY

Systems and methods provide a content encryption schema for integrating digital rights management (DRM) in a multicast/broadcast encryption system. In one implementation, an exemplary integrated key schema provides content encryption keys that can be employed by a multicast process, while providing DRM protection of recorded multicast content via a single DRM decryption secret. The integrated key schema provides high security and allows encrypted multicast content to be saved directly to local files. A license server can efficiently manage and generate DRM keys to be delivered to clients because only a single key needs to be delivered per license to a client. The integrated key schema can be applied together with conventional broadcast or multicast encryption techniques.

This summary is provided to introduce an exemplary content encryption schema for integrating DRM with multicast/broadeast, which is further described below in the Detailed Description. This summary is not intended to identify essential features of the claimed subject matter, nor is it intended for use in determining the scope of the claimed subject matter.

DETAILED DESCRIPTION

Overview

Figure 1:
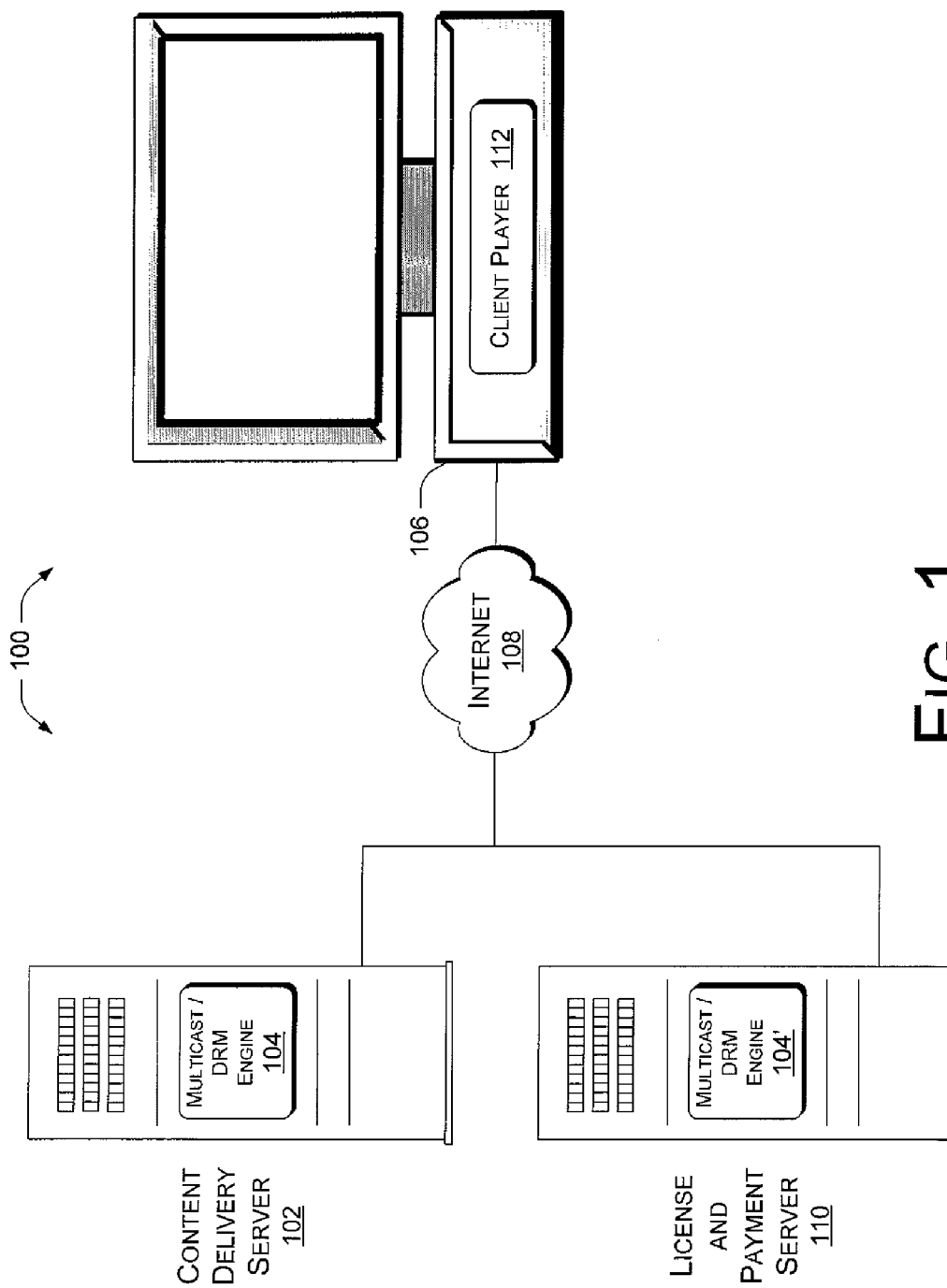
FIG. 1 is a diagram of an exemplary system integrating DRM with encrypted multicast.

Described herein is a content encryption schema for integrating digital rights management (DRM) with a multicast/broadcast encryption system. The exemplary encryption schema provides content encryption keys to be used by a multicast/broadcast system and facilitates subsequent DRM protection of multicast content that has been saved. In one implementation, the exemplary encryption schema generates a secret and then a prime number for each block of data content. The schema derives a content encryption key for each block from the secret and each corresponding prime number. Then the exemplary schema subsequently derives a single decryption secret to grant access to a user's particular saved recording of the multicasted/broadcasted content. The single decryption secret is derived from the corresponding prime numbers of the collection of stored blocks that constitute the user's recording. Thus, the prime numbers generated for each individual block enable production of content encryption keys usable by a multicast/broadcast system and also enable a single decryption key to be created for subsequent DRM of saved content.

The content encryption keys can be used by a multicast/broadcast system when rekeying occurs, but should not be confused with the multicast system's own key distribution techniques for controlling access. The exemplary integrated key schema described herein can be applied together with conventional restricted broadcast or multicast encryption techniques.

The exemplary integrated encryption key schema described herein facilitates the two conventionally diverse multicast/broadeast and DRM schemata that have different purposes and goals. Thus, the exemplary integrated key schema works well for supplying content encryption keys to a multicast/broadcast process while simultaneously facilitating subsequent DRM protection of the saved content via a single DRM key that can be sent in a license.

The exemplary key schema is secure to collusion attacks in which clients with knowledge of different content encryption keys work together attempting to derive new keys. The exemplary key schema has the additional advantage that multiple recorded files can be merged together directly into a single file by the client, and only a single secret needs to be delivered in a license to decrypt the merged file, regardless of whether the merged file contains consecutive encryption blocks or not.

The term "encryption block" or simply "block" means a segment of data encrypted under the same content encryption key in broadcast or multicast. Auxiliary data assisting decryption of the encrypted data such as the encryption block ID may also be included in the encryption block. In restricted multicast or broadcast, distributed content consists of a sequence of encryption blocks.

The following description uses the term "key" to mean a piece of information used to encrypt or decrypt data, and uses the term "secret" to mean a piece of nonpublic information used to generate or derive a "key." Nonetheless, it should be noted that "key" and "secret" are often considered interchangeable terms in cryptography.

In the following description, the terms "restricted multicast/broadcast" and "encrypted multicast/broadcast" denote examples of information transfer in which the transferred information is encrypted to allow only selected recipients, who possess a secret or an access right, to decrypt the information. Restricted broadcast/multicast will be referred to herein by the representative term "restricted multicast" or just "multicast."

Exemplary System

FIG. 1 shows an exemplary system 100 that integrates DRM with encrypted multicast. A content delivery server 102 hosts one or more components of an exemplary multicast/DRM engine 104. The multicast/DRM engine 104 sends content, such as multimedia content, to a select recipient 106 over a network, for example, the Internet 108. The content is divided into blocks (e.g., corresponding to multicast rekeying intervals) and encrypted by numerous content encryption keys, one for each block, in order to limit access to the content to current subscribers and other intended recipients. A license and payment server 110 may also host one or more components of the exemplary multicast/DRM engine 104'. The recipient 106 has a client-side content player 112 that can play live multicast or can use a DRM secret granted by the license and payment server 110 to play saved content.

For each block of content, the exemplary multicast/DRM engine 104 of the content delivery'server 102 generates a content encryption key for that block from a prime number generated to be unique to that block. This content encryption key is adapted by the multicast process being used. For facilitating subsequent DRM, the content delivery server 102 also transmits the corresponding prime numbers of the transmitted blocks to the client-side content player 112 to be stored when the content itself is stored. The corresponding prime numbers may be transmitted and stored separately from the content to be stored. Alternatively, the corresponding prime numbers may be embedded, e.g., in an auxiliary field of each content block, and sent as a part of the content blocks (shown in FIG. 3). The corresponding prime numbers are used in regenerating the decryption keys for saved blocks at the client side when used with a secret in a license delivered from the license server.

To implement DRM, rather than send a decryption key or secret for each block stored locally at the client 106, the multicast/DRM engine 104' of the license and payment server 110 generates a single DRM secret that allows the recipient 106 to replay an arbitrary collection of the stored content blocks, upon request. The single DRM secret enables the client-side content player 112 to generate decryption keys for and only for the specified arbitrary collection of stored content blocks. The license and payment server 110 simply includes the single DRM secret customized to meet the recipient's request in a license to the recipient 106.

Exemplary Engine

Figure 2:
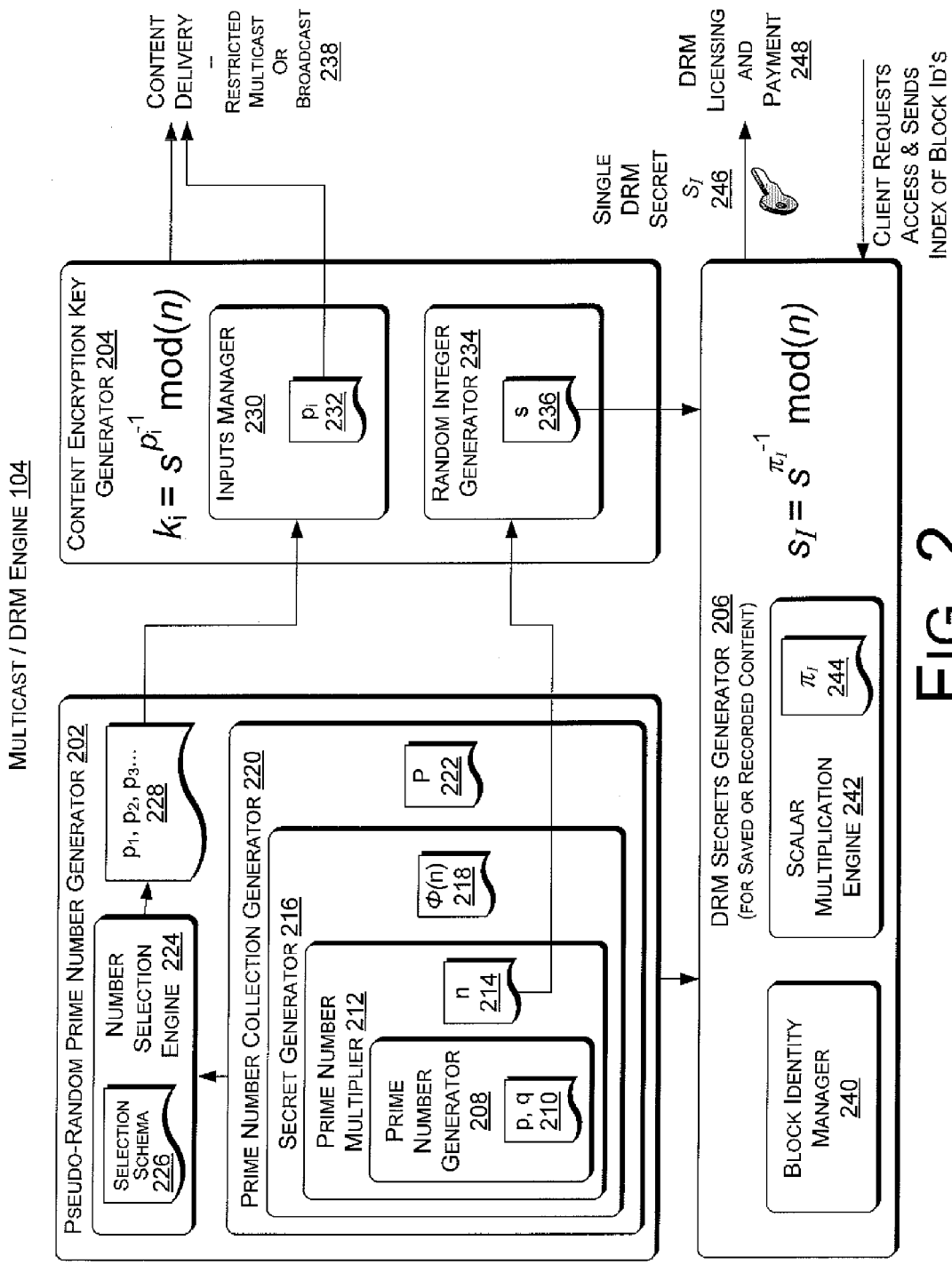
FIG. 2 is a block diagram of an exemplary multicast/DRM engine.

FIG. 2 shows the exemplary multicast/DRM engine 104 of FIG. 1, in greater detail. The illustrated implementation in FIG. 2 is only one example configuration, for descriptive purposes. Many other arrangements of the illustrated l components or even different components constituting an exemplary multicast/DRM engine 104 are possible within the scope of the subject matter. Such an exemplary multicast/DRM engine 104 can be executed in hardware, software, or combinations of hardware, software, firmware, etc.

A comprehensive form of the exemplary multicast/DRM engine 104 (or 104') includes a pseudo-random prime number generator 202, a content encryption key generator 204, and a DRM secrets generator 206. Typically, the multicast/DRM engine 104 in the content delivery server 102 includes the pseudo-random prime number generator 202 and the content encryption key generator 204, while the multicast/DRM engine 104' in the license and payment server 110 includes the DRM secrets generator 206. Thus, in some implementations, the versions of the multicast/DRM engine 104 and 104' are different in general but share some information such as s, n, p, and q, (to be described below) and the prime numbers associated with the saved blocks that a client requests to replay.

The pseudo-random prime number generator 202 includes a prime number generator 208 to produce large prime numbers 210, such as "p" and "q." The prime number generator 208 is included in a prime number multiplier 212, which in one implementation multiplies the large prime numbers 210 together to obtain product n 214. The prime number multiplier 212 is included in a secret generator 216 that produces a secret, such as $\phi(n)$ 218, which in one implementation is related to the large prime numbers 210 according to $\phi(n)=(p-1)(q-1)$. The secret generator 216, in turn, is included in a prime number collection generator 220, which generates a large collection of distinct prime numbers P 222. The pseudo-random prime number generator 202 further includes a number selection engine 224 that implements a selection schema 226 to produce the pseudo-random sequence 228 of distinct prime numbers $p_1, p_2, \ldots, p_i$ which are all co-prime to $\phi(n)$ 218. In one implementation the pseudo-random sequence 228 of distinct prime numbers is generated by selecting pseudo-randomly those numbers from the collection P that are co-prime to φ(n) 218.

The content encryption key generator 204 introduced above further includes an inputs manager 230, e.g., for inputting a current prime number $p_i$ 232 of the i-th prime number of the pseudo-random sequence 228 of prime numbers, to be used to generate an encryption key for a corresponding i-th content block. The content encryption key generator 204 further includes a random integer generator 234 for producing a random integer s 236 based on product n 214, which in one implementation is related to the product n 214 according to s ∈ (1, n) and the integer s 236 is co-prime to the product n 214. The content encryption key generator 204 produces per-block content encryption keys for multicast content delivery 238 and readies the current prime number 232 for transmittal or for embedding in a corresponding content block, both for subsequent DRM.

The DRM secrets generator 206 may include a block identity manager 240 to receive a list of identities of blocks in a recording—a collection of blocks—to be replayed from the client's local storage. The block identity manager 240 also coordinates obtaining from the system 100 the corresponding prime number for each block in the collection. The DRM secrets generator 206 may include a scalar multiplication engine 242 to produce a product $\pi_1$ 244 consisting of the corresponding prime numbers $\{p_i\}$ 232 of the blocks constituting the locally stored collection to be replayed at the client-side content player 112. The DRM secrets generator 206 generates a single DRM secret $s_f$ 246 that can be used to derive the decryption keys for each block of the stored content to be replayed. It is worth noting that the blocks in the client's stored collection to be replayed (e.g., a saved computer file of multimedia content) do not have to be contiguous (e.g., blocks corresponding to an advertisement can be omitted) and do not have to be in temporal order (the user may wish to play the content in reverse, or jump around in the content). The single DRM secret 246 is sent to DRM licensing and payment 248, e.g., to a licensing and payment server 110.

In another implementation, the DRM secrets generator 206 resides in the multicast/DRM engine 104' inside the license and payment server 110. In this implementation, the multicast/DRM engine 104 inside the content delivery server 102 and the multicast/DRM engine 104' inside the license and payment server 110 share the pair of numbers {n,φ(n)} (214, 218, respectively) as well as the collection P 222, the integer s 236, and the selection schema 226. The shared information is used to derive the single DRM secret $s_f$ 246 delivered in a DRM license to a client during license acquisition.

Operation of the Exemplary Engine

In one implementation, the exemplary integrated key schema is based on the strong RSA assumption to generate content encryption keys for multicast. As introduced above, the exemplary key schema dramatically simplifies key management and delivery in DRM subsequently applied to multicast content that has been recorded. In one implementation, encrypted media from multicast is directly saved to a client's local storage. Only a single key, the DRM decryption secret 246, needs to be contained in a license for replaying a recorded content object.

The exemplary key schema generates content encryption keys for multicast encryption by taking into account the specific requirements of the DRM applied subsequently to recorded contents. As mentioned, the exemplary key schema is based on the strong RSA assumption and in one implementation includes the four processing phases of setting up, multicasting, recording content, and playing back the recorded content.

Setup

In one implementation, the prime number generator 208 first generates two large prime numbers p and q 210. The prime number multiplier 212 obtains n 214 by processing n=p·q and the secret generator 216 obtains a secret φ(n) 218 by processing φ(n)=(p−1)(q−1). The prime number collection generator 220 then selects a collection P 222 of distinct prime numbers. A selection schema 226 is used by the number selection engine 224 to pseudo-randomly select numbers co-prime to φ(n) 218 sequentially from P 222 to obtain the pseudo-random sequence 228 of prime numbers.

In one implementation, the selection of the prime numbers from P 222 is exclusive, i.e., a selected number will not be selected again in future selections. An example selection schema 226 directs the number selection engine 224 to pseudo-randomly permute the numbers in P 222, and then select the numbers that are co-prime to φ(n) 218 according to the resulting order. The equation $p_i$=P[i] denotes the i-th number of the numbers selected by the selection schema 226 from the collection P 222, which are relatively prime to φ(n) 218. Thus, the pseudo-random sequence $p_1, p_2, p_3, \ldots$ 228 is the sequence of numbers selected from P 222 by the number selection engine 224 that are all relatively prime to φ(n) 218, and no two numbers are equal. The number n 214 and the collection P 222 are publicly known, while the secret number φ(n) 218 and the selection schema 226 to select numbers from P 222 remain secret information.

The reason that the selection schema 226 is kept secret is to prevent a hacker from knowing the numbers that may be selected from P 222 by the number selection engine 224 that are not relatively prime to φ(n) 218, since such information can be used to deduce the secret φ(n) 218. The pair of numbers {n,φ(n)} (214, 218, respectively) as well as the collection P 222, the integer s 236, and the selection schema 226 are shared with the license server 110, which uses the information to derive content encryption keys during license acquisition. In one implementation, the content delivery server 102 for multicast also serves as the license server 110 for the DRM system.

Multicasting

Figure 3:
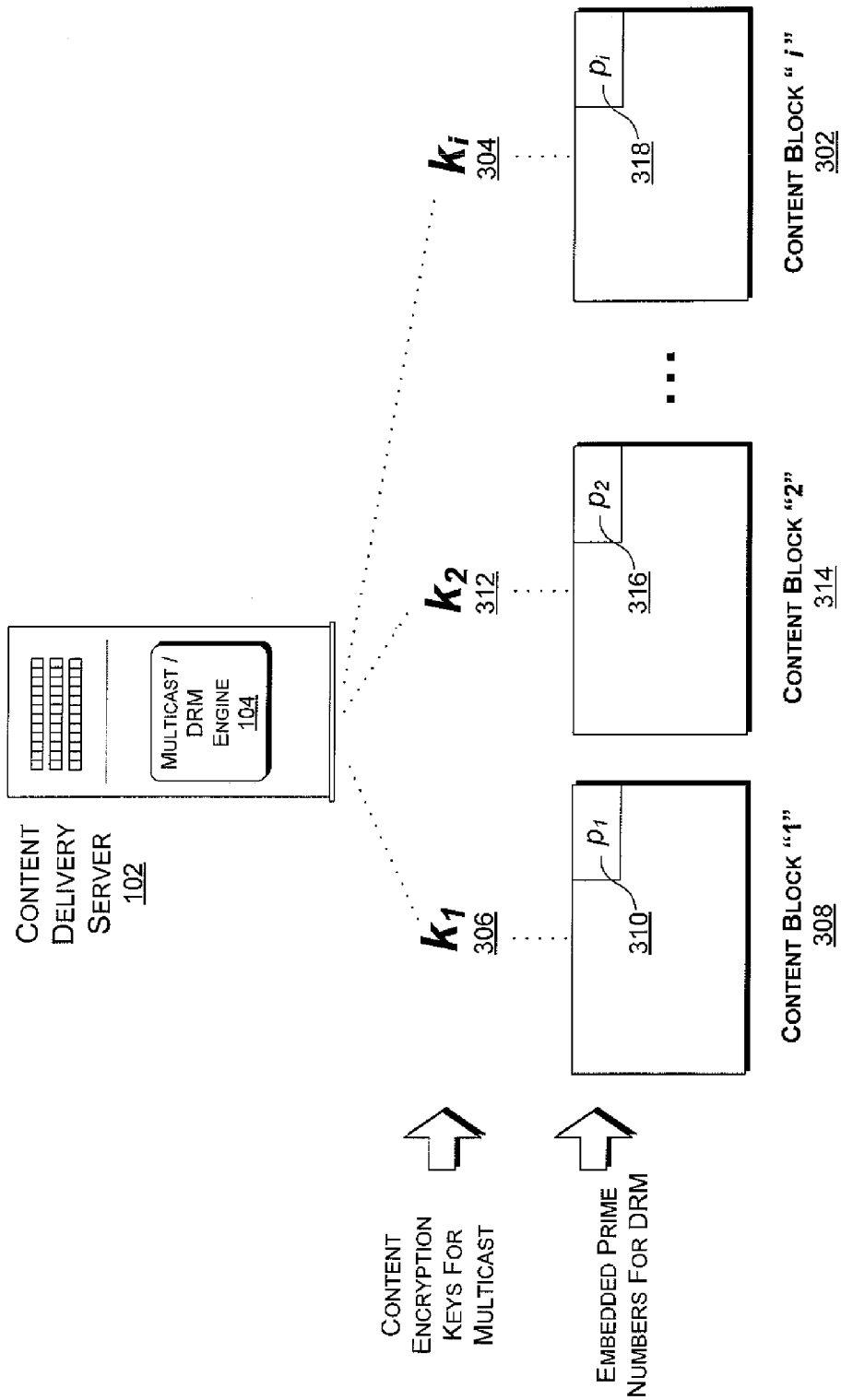
FIG. 3 is a diagram of exemplary multicast content production.

Referring to FIG. 3 as well as to FIG. 2, for multicasting, let $B_i$ denote the i-th encryption block and $k_i$ 304 denote the corresponding encryption key in multicast. To generate the first content encryption key $k_1$ 306, i.e., the encryption key for the first encryption block $B_1$ 308, the content encryption key generator 204 selects a random integer s 236 (s ∈ (1,n)), where s 236 is relatively prime to n 214, and the inputs manager 230 obtains the first prime number $p_1$=P[1] 310 co-prime to φ(n) 218 from the collection P 222. The content encryption key generator 204 sets the first encryption key $k_1$ 306 to be $s^{p_1^{-1}}$ mod n. The number s 236 is also shared with the license server 110 in order to generate keys to deliver in licenses to clients 106 to replay saved contents. The integer s 236 is not kept as a secret, but is publicly available.

When the first rekeying is needed in multicast, the content encryption key generator 204 generates a new content encryption key $k_2$ 312 to encrypt the second encryption block $B_2$ 314. To do so, the inputs manager 230 obtains the second prime number $p_2$ 316 co-prime to φ(n) 218 from P 222, i.e., $p_2$=P[2]. The content encryption key $k_2$ 312 for the second encryption block $B_2$ 314 is determined by $k_2 = s^{p_2^{-1}}$ mod n. The content encryption key generator 204 iterates this procedure whenever rekeying is needed, e.g., due to a change in membership of the multicast.

In general, for the i-th rekeying, the content encryption key generator 204 generates the (i+1)-th content encryption key $k_{i+1}$ to encrypt the (i+1)-th encryption block $B_{i+1}$. This is accomplished by the inputs manager 230 first obtaining the (i+1)-th prime number $p_{i+1}$ co-prime to $\phi(n)$ 218 from the collection P 222: $p_{i+1}=P[i+1]$. The (i+1)-th content encryption key $k_{i+1}$ is determined by $k_{i+1}=s^{p_{i+1}^{-1}}$ mod n, where $i \geq 0$.

As noted above, the prime number, e.g., $p_i$ 318, may be packaged into an auxiliary field 320 in the encryption block $B_i$ 302 to be sent to clients. Alternatively, the prime number $p_i$ 318 can be multicast in-band to clients separately from the content delivery server 102. In describing the exemplary key schema, it is assumed that there is no loss in transmitting the selected prime numbers 318 to a client 106. If that is not the case in a particular application, then error correction or redundant transmission of the selected prime numbers 318 may be used to ensure that clients 106 receive all the transmitted prime numbers 318. It is worth reemphasizing that the transmitted prime numbers 318 are not used in live multicast decryption. Rather, the prime numbers 318 are used in generating keys by the client-side DRM module when decrypting saved content.

Recording Content

Figure 4:
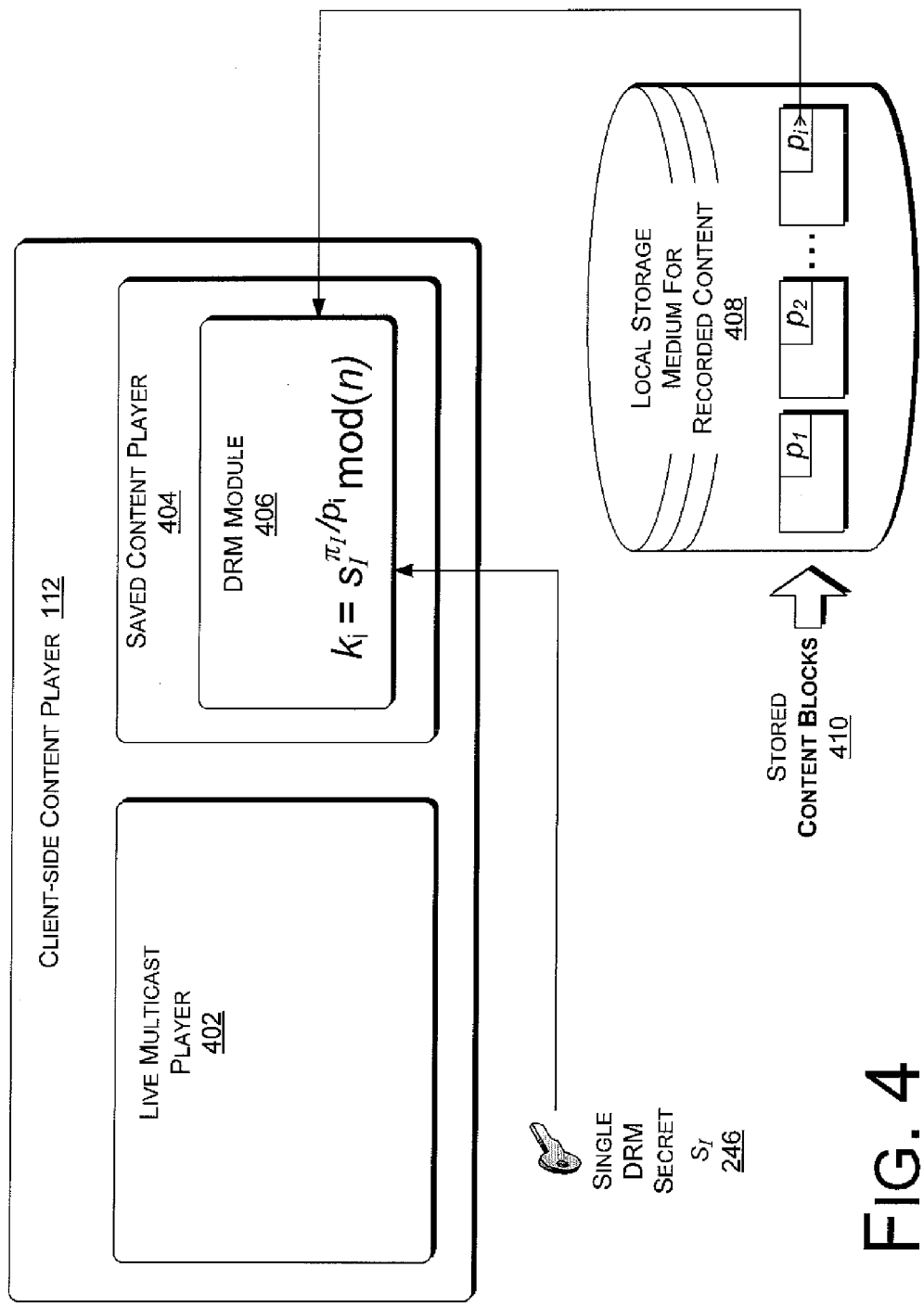
FIG. 4 is a diagram of an exemplary client-side content player.

Referring to FIG. 4, in one implementation, an exemplary client-side content player 112 has a live multicast player 402 and a saved content player 404 that includes a client-side DRM module 406. The exemplary client-side content player 112 has access to a local storage medium for content 410 recorded from the live multicast player 402. The client-side content player 112 simply saves the encrypted content 410 received from restricted multicast directly into local storage 408 for subsequent replays. In this implementation, there is no need to perform transcryption. For example, a user 106 may wish to record j+1 consecutive encryption blocks from block $B_i$ to block $B_{i+j}$ for replays in the future.

In one implementation, the encryption blocks $B_i, \ldots, B_{i+j}$ along with the prime numbers $p_i, \ldots, p_{i+j}$ received from multicast are saved to the local storage 408. The saved files 410 can be distributed to other users or devices if desired, since as in a conventional DRM system, the protected content can be redistributed without restriction. Without a proper license, however, a user cannot play protected content.

A live multicast program may contain some uninteresting content such as advertisements that a user 106 does not wish to replay. In other words, a user 106 may save nonconsecutive encryption blocks into a saved file 410. A saved file 410 containing nonconsecutive encryption blocks can also occur when multiple saved files are merged into a single file. The exemplary integrated key schema works with a saved file 410 containing nonconsecutive encryption blocks. In fact, the exemplary key schema works equally well when a saved file 410 consists of an arbitrary combination of encryption blocks $\{B_i | i \in I\}$, where I is an arbitrary set of block indices.

Playing Back the Recorded Content

A valid license with appropriate rights is typically requested before a client-side content player 112 can consume the recorded content 410. A client 106 acquires a license from the license server 110. During license acquisition, the client 106 typically sends the license server 110 a list of the collection of block indices I that the saved file 410 contains, along with other identification information that may be present. A payment is sometimes required at this point in the process. After the license server 110 authenticates the client 106, the DRM secrets generator 206 (FIG. 2), which may be physically located in the license server 110, generates a DRM secret $s_I$ 246 according to $s_I=s^{\pi_I^{-1}}$ mod n for the encryption blocks $\{B_i | i \in I\}$, where the scalar multiplication engine 242 calculates scalar product $\pi_I$ 244 as $\pi_I=\Pi_{i \in I} p_i$, and delivers the single DRM secret 246 in a license to the client 106. Only a single secret key 246 is contained in the license to be delivered to a client 106.

In playing-back recorded encryption blocks $B_i, i \in I$, the client-side DRM module 406 calculates the corresponding decryption keys $k_i$ 304 from both the DRM secret $s_I$ 246 contained in the license and the received prime numbers $p_i$ 318 via the equation $k_i=s_I^{\pi_I/p_i}$ mod n (in this implementation, encryption and decryption are assumed to be symmetrical, i.e., the encryption key $k_i$ and the decryption key $k_i$ are the same key). Having generated the decryption key $k_i$ 304, the client-side DRM module 406 can decrypt the i-th block $B_i$ 302. This process can be applied to all the recorded encryption blocks $\{B_i | i \in I\}$ contained in the saved file 410. As analyzed further below, the client-side content player 112 can derive only the content encryption keys 304 associated with the blocks $\{B_i | i \in I\}$, which is exactly the permission to decrypt granted by the license server 110 during the license acquisition. The client-side DRM module 406 cannot derive encryption keys associated with any other blocks.

It is worth noting that the above playback applies only to the recorded content 410. The exemplary DRM part of the operation does not affect live multicast playing. In fact, content being received via live multicast can be played as usual as if the exemplary integrated key schema was absent.

Exemplary Methods

Figure 5:
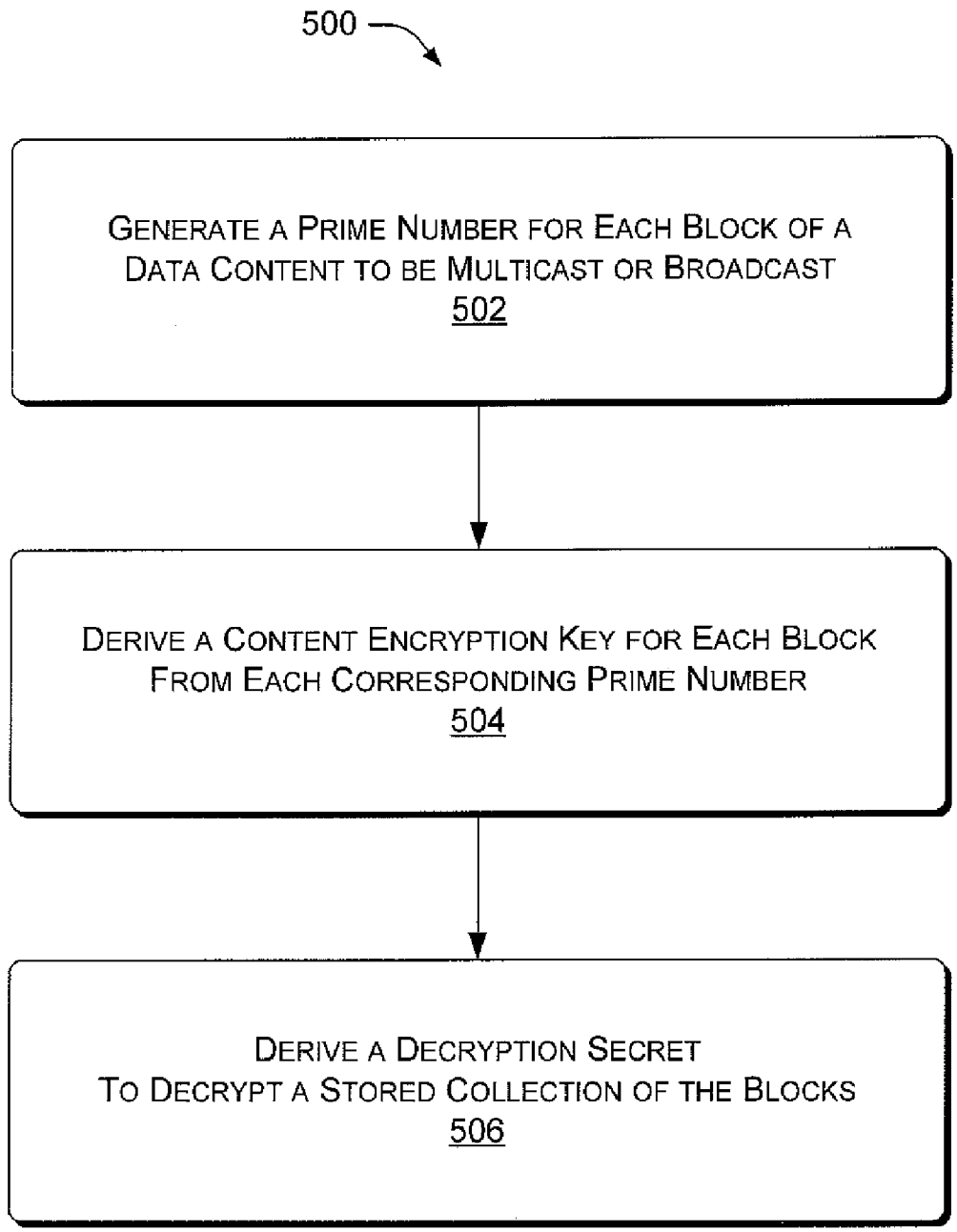
FIG. 5 is a flow diagram of an exemplary method of integrating DRM with encrypted multicast.

FIG. 5 shows an exemplary method 500 of integrating DRM with encrypted multicast, In the flow diagram, the operations are summarized in individual blocks. The exemplary method 500 may be performed by hardware, software, or combinations of hardware, software, firmware, etc., for example, by components of the exemplary multicast/DRM engine 104.

At block 502, a prime number is generated for each block of a data content to be multicast. In one implementation, a prime number generator produces two large prime numbers p and q, and obtains a secret $\phi(n)$ by calculating $\phi(n)=(p-1)(q-1)$. A collection P of prime numbers is created. Then, a selection schema produces a pseudo-random sequence of the distinct prime numbers, where each prime number $p_i$ in the sequence is co-prime to $\phi(n)$ and is assigned to a block $B_i$ of content to be multicast.

At block 504, a content encryption key is derived for each block from the corresponding prime number $p_i$ of each block. In one implementation, to generate a content encryption key $k_i$ for an encryption block $B_i$, a random integer s is generated, wherein s is relatively prime to a product of the two large prime numbers. Then the content encryption key is defined as $s^{p_i^{-1}} \mod(n)$.

Each prime number secret $p_i$ may be packaged into an auxiliary field in the corresponding encryption block to be sent to clients. Or, the prime numbers can be multicast in-band to clients separately from the content.

At block 506, a single DRM decryption secret is derived from the corresponding prime numbers of a stored collection of the blocks. That is, a single DRM key can be derived from the identities of a stored, arbitrary collection of multicast content blocks. The single DRM key is typically transmitted to a client in a license requested by the client. During license acquisition, the client typically sends the license server a list of the block indices I in a collection of blocks constituting a saved recording. The single DRM key $s_I$ is generated by calculating $s_I=s^{\pi_I^{-1}}$ mod n for the encryption blocks that happen to be in the client's saved recording file, where $\pi_I=\Pi_{i \in I} p_i$, and $p_i$ is the prime number associated with the saved block $B_i$.

In playing-back a recorded encryption block, its decryption key $k_i$ is calculated from the received single DRM secret $s_I$ contained in the license and the prime number $p_i$ associated with the encryption block $B_i$, via the equation $k_i = s_I^{\pi_I/p_i} \mod n$. Having generated the decryption key $k_i$, the i-th block $B_i$ can be decrypted. This process can be applied to all the recorded encryption blocks included in the client's recording.

Security Analysis of the Exemplary Integrated Key Schema

Security of the exemplary integrated key schema is now analyzed. In one implementation, the security of the exemplary schema depends on the deduction of $\phi(n)$ 218, which is usually done by factoring n 214. Factoring a large integer is believed to be a hard problem that the security of well-known RSA encryption schemata also relies upon. Thus, the exemplary key schema appears secure, but further proof is now offered.

The keys $\{k_i | i \in I\}$ can derive the secret $s_I$ 246 and vice versa with the selected prime numbers made available. Key $k_i$ 304 is calculated by $s_I^{\pi_I/p_i} \mod n$ as described above. Reversely, $s_I$ 246 can be computed from the keys $\{k_i | i \in I\}$. Since the integers $\{p_i | i \in I\}$ 318 are different prime numbers, the integers $\{\pi_I/p_i | i \in I\}$ are co-prime. Recall that scalar product $\pi_I$ 244 is calculated by $\pi_I = \Pi_{i \in I} p_i$. Therefore there exists a set of integers $\{\alpha_i | i \in I\}$ such that $\Sigma_{i \in I}(\pi_I/p_i) \cdot \alpha_i = 1$. The set of integers $\{\alpha_i | i \in I\}$ can be calculated with the Euclidean algorithm. Then, $\Pi_{i \in I} k_i^{\alpha_i} = s_I$, that is, $s_I$ 246 can indeed be calculated from the keys $\{k_i | i \in I\}$. It can thus be concluded that knowledge of the keys $\{k_i | i \in I\}$ is equivalent to knowledge of the key $s_I$ 246 when all the prime numbers used are publicly available.

Security of the exemplary integrated key schema is also equivalent to the following mathematical problem:

Given a message m, a positive integer n=pq of the product of two large unknown primes p and q, and a set of signatures $c_i = m^{d_i} \mod n$ signed with the distinct RSA private keys $\{d_i | i > 0\}$, find the signature $c_0 = m^{d_0}$ signed by another private key $d_0$, where all the corresponding RSA public keys $\{e_i | e_i \cdot d_i = 1 \mod \phi(n), i \geq 0\}$ are distinct primes.

The above problem appears to be a hard problem. Like other hard problems in cryptography, it often cannot be proved mathematically that the problem is indeed a hard problem. In the following, we shall prove that the exemplary integrated key schema is equivalent to the strong RSA problem which is believed to be a hard problem. Therefore the exemplary integrated key schema is secure.

From a different viewpoint for offering proof of security, if an adversary could break the exemplary integrated key schema described above, then it can be shown that, by the same token, the adversary should also be able to solve the "Strong RSA problem", which is believed to be a hard problem. In other words, cracking the security of the exemplary integrated key schema would be tantamount to breaking Strong RSA encryption itself, as now demonstrated:

Definition (strong RSA assumption): Given a RSA modula n, and a random number $c \in Z_n^\Phi$, it is hard to compute a pair (e,m), such that $m^c = c \mod n$.

Lemma: The exemplary integrated key schema is equivalent to the strong RSA problem.

Proof. Assume that an adversary A can break the exemplary integrated key schema, then it is possible to build an algorithm B to solve the Strong RSA problem. On input (n,c), B aims to output a pair (e,m), such that $m^e = c \mod n$. B uses the following method-of-operation with A.

First, B chooses $\alpha$ a primes $p_i$ (i $\in [0, \ldots, \alpha]$), and sets $\beta = \Pi_{i \in [0, \ldots, \alpha]} p_i$, and then computes $s = c^\beta \mod p$. Finally, B gives (n,s) to A. This simulates the "setting up" and aspects of the "multicasting" processing phases of the exemplary integrated key schema described above.

Then A can ask B for $k_i$, $\alpha$ times. B replies as $(p_i, k_i)$, such that $k_i = c^{\beta/p_i} \mod n$. Note that $\gcd(\beta, p_i) = p_i$, hence $\beta/p_i$ is an integer. This simulates the "multicasting," "recording content," and "playing back recorded content" processing phases of the exemplary integrated key schema, described above.

At last, A outputs a valid new key k for a prime e, such that $k = s^{1/k} = c^{\beta/k} \mod n$. Then B can solve the Strong RSA problem, and obtains m as follows:

1. Since $\gcd(\beta, e) = 1$, then there is a pair (a,b), such that $a\beta + be = 1$.

2. Compute $m = k^a \times c^b \mod n$.

Since $$m^e = (k^a \times c^b)^e \mod n$$
$$= (c^{\frac{\beta a}{e}} c^b)^e \mod n$$
$$= c^{a\beta + be} \mod n$$
$$= c \mod n$$

This ends the proof.

The publicly distributed prime numbers $\{p_i\}$ 228 can be used to gain some knowledge of the secret $\phi(n)$ 218, i.e., $\phi(n)$ 218 cannot be divided by these numbers. If multicast has rekeyed l−1 times, the search space for $\phi(n)$ 218 shrinks to $\Pi_{i=1}^{l}(p_i - 1)/\Pi_{i=1}^{l} p_i$ relative to the original search space. If all the prime numbers $\{p_i\}$ 228 are large enough, and the total number of blocks is not very large, shrinkage of the search space is relatively small and should not cause any noticeable security vulnerability.

Comparison with the Conventional Techniques

The exemplary integrated key schema described above offers some major advantages over the conventional "direct" and "transcryption" straightforward methods described in the Background Section above.

Compared with the conventional transcryption technique, the exemplary integrated key schema has the same simplicity that only a single secret 246 is generated and transmitted to a client 106 in a license, yet without the computational overhead, the complexity of negotiating a conventional DRM encryption key with the license server for re-encryption, and the additional security requirements needed for the conventional transcryption technique. No transcryption is needed in the exemplary key schema. Content from live multicast can be saved directly to the local storage 408 for subsequent replays.

Compared with the conventional "direct" recording technique, the exemplary integrated key schema has the same efficiency in saving the content directly to local storage 408, yet without the burden of complex key management or a large number of keys being delivered per license to a client. In other words, the integrated key schema combines the advantages of both of the above straightforward methods.

The exemplary integrated key schema has an additional advantage over the conventional transcryption technique when multiple recorded files needing to be merged into a single one. In the conventional transcryption method, yet another transcryption is required since the recorded files are encrypted with different content encryption keys and the merged content needs to be encrypted with a single encryption key so that a license server knows how to generate the key when a client acquires a license. Merging can easily be accomplished in the exemplary integrated key schema Oust as it is for the conventional direct recording technique) by simply concatenating recorded files together according to the sequence numbers of the encryption blocks and removing duplicated blocks. The resulting merged file can contain an arbitrary collection of blocks. These blocks are not necessarily consecutive. A new license may be needed to play the merged file. For the exemplary integrated key schema, the license server easily generates a new DRM secret 246 and delivers the single secret 246 to a client 106. But for conventional direct recording techniques, all the encryption keys associated with the encryption blocks contained in the merged file have to be delivered to the client. This means that the size of a conventional license in conventional DRM under the direct recording technique can be quite large.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
generating a collection of prime numbers;
determining that a rekey is needed for a collection of data blocks that are to be broadcast or multicast to a recipient device;
generating a plurality of content encryption keys to encrypt the collection of data blocks, generating the plurality of content encryption keys being based at least on a plurality of prime numbers selected from the collection of prime numbers;
publishing the collection of prime numbers; and
deriving a single digital rights management (DRM) decryption secret to be sent to the recipient device without sending a plurality of decryption keys for decrypting the collection of data blocks to the recipient device, wherein deriving the single DRM decryption secret is based at least on a scalar multiplication product of the plurality of prime numbers that have been selected for generating the plurality of content encryption keys of the collection of data blocks, and wherein the scalar multiplication product of the plurality of prime numbers used in deriving the single DRM decryption secret enables the plurality of decryption keys to be derived for the collection of data blocks from the single DRM decryption secret.

2. The method as recited in claim 1, further comprising sending the DRM decryption secret to the recipient device to implement digital rights management (DRM).

3. The method as recited in claim 1, further comprising:
generating two large prime numbers;
deriving a secret number by multiplying a first quantity comprising the first large prime number minus one times a second quantity comprising the second large prime number minus one; and
generating for a current data block a prime number co-prime to the secret number and different from the prime numbers used for previous data blocks.

4. The method as recited in claim 3, wherein generating the plurality of content encryption keys to encrypt the collection of data blocks further comprises:
applying a secret selection process to randomly select the prime number from the collection of prime numbers for the current data block, the selected prime number being different from the previously selected prime numbers and co-prime to the secret number; and applying the selected prime number to the current data block.

5. The method as recited in claim 1, further comprising embedding each prime number in a corresponding block.

6. The method as recited in claim 1, further comprising transmitting each prime number to the recipient device in-band with transmitting corresponding blocks.

7. The method as recited in claim 1, wherein generating the plurality of content encryption keys further comprises calculating $k_i = s^{p_i^{-1}} \mod(n)$;
wherein $k_i$ is the content encryption key for the i-th block;
wherein $n = pq$ is a multiplication product of two large prime numbers p and q;
wherein s is an integer in the range of (1,n) and co-prime to n; and
wherein $p_i$ is the prime number corresponding to the i-th block and co-prime to $\phi(n)=(p-1)(q-1)$.

8. The method as recited in claim 1, wherein deriving the single DRM decryption secret for the collection of the data blocks further comprises calculating $s_I = s^{\pi_I^{-1}} \mod(n)$, wherein $s_I$ is the single DRM decryption secret for the collection I of the data blocks, n is a multiplication product of two large prime numbers, s is an integer co-prime to n, and $\pi_I$ is the scalar multiplication product $\pi_I = \Pi_{i \in I} p_i$, wherein $p_i$ is the prime number corresponding to the i-th block.

9. The method as recited in claim 8, further comprising deriving the plurality of decryption keys for the collection of data blocks from the single DRM decryption secret by calculating $k_i = s_I^{\pi_I/p_i} \mod(n)$, wherein $k_i$ is the content encryption key for the i-th block.

10. The method as recited in claim 1, further comprising transmitting the single DRM decryption secret to the recipient device in a license for deriving the plurality of decryption keys for the collection of data blocks.

11. The method as recited in claim 1, further comprising encrypting the collection of data blocks via corresponding content encryption keys;
sending the collection of encrypted data blocks via multicast or broadcast to the recipient device for storage on a local storage medium of the recipient device; and
sending the single DRM decryption secret to the recipient device to decrypt the collection of encrypted data blocks.

12. The method as recited in claim 11, further comprising:
storing the collection of encrypted data blocks directly on the local storage medium as encrypted multicast or broadcast blocks; or
transcrypting the collection of encrypted data blocks into a DRM format and storing the collection of encrypted data blocks as DRM encrypted blocks.

13. The method as recited in claim 1, wherein generating the collection of prime numbers comprises:
generating a first secret; and
generating the collection of prime numbers that are co-prime to the first secret.

14. The method as recited in claim 1, wherein selecting the plurality of prime numbers from the collection of prime numbers comprises:
randomly permuting the prime numbers in the collection of prime numbers according to a selection schema;
selecting the plurality of prime numbers from the randomly permuted collection of prime numbers according to the selection schema, wherein the selection schema is kept secret.

15. A system, comprising: a content encryption key generator stored in a server device for creating an encryption key for each block of a data content to be multicast or broadcast to a recipient device, wherein creating the encryption key comprises:

generating an initial sequence of prime numbers, randomly permuting the prime numbers in the initial sequence of prime numbers according to a selection schema, selecting a prime number from the randomly permuted sequence of prime numbers according to the selection schema, and generating the encryption key based at least on the selected prime number, wherein:

the initial sequence of prime numbers is allowed to be made publicly known, and the selection schema is kept secret; and a digital rights management (DRM) secrets generator stored in a server device that creates a single DRM decryption secret to be used to derive decryption keys for decrypting a collection of blocks of the data content that is stored the recipient device and wherein a scalar multiplication product of the plurality of prime numbers is used in deriving the single DRM decryption secret and enables the plurality of decryption keys to be derived for the collection of data blocks from the single DRM decryption secret.

16. The system as recited in claim 15, wherein the content encryption key generator creates a new encryption key to begin a new block of the data content whenever rekeying is needed in the multicast or broadcast.

17. A system, comprising:

a prime number collection generator stored in a server device that generates a collection of prime numbers, wherein the collection of prime numbers is allowed to be made publicly known;

a prime number selector stored in the server device that randomly selects a prime number from the collection of prime numbers for each block of a data content to be multicast or broadcast;

a content encryption key generator stored in the server device that derives a content encryption key for each block from each corresponding prime number; and a digital rights management (DRM) secrets generator stored in the server device that creates a single DRM decryption secret from the corresponding prime numbers associated with a stored collection of blocks in a recipient device, and sends the single DRM decryption secret to the recipient device without sending decryption keys for decrypting the stored collection of blocks, wherein the single DRM decryption secret is created based at least upon a scalar multiplication product of each randomly selected prime number for each block, and wherein the scalar multiplication product enables the decryption keys for the stored collection of blocks to be derived from the single DRM decryption secret.

18. The system as recited in claim 17, wherein the content encryption key generator calculates $k_i = s^{p_i^{-1}} \mod(n)$ to generate a content encryption key;

wherein $k_i$ is the content encryption key for the i-th block;

wherein $n = pq$ is a multiplication product of two large prime numbers p and q;

wherein s is an integer in the range of (1,n) and co-prime to n;

wherein $p_i$ is the prime number corresponding to the i-th block ; and wherein $p_i$ is a prime number that is co-prime to a secret obtained by multiplying a first quantity consisting of the first large prime number minus one times a second quantity consisting of the second large prime number minus one.

19. The system as recited in claim 17, wherein the DRM secrets generator derives the single DRM decryption secret for an arbitrary collection of the blocks by calculating $s_I = s^{\pi_I^{-1}} \mod(n)$, wherein $s_I$ is the single DRM decryption secret for the collection I of the blocks, n is a multiplication product of two large prime numbers, s is an integer generated from n, and $\pi_I$ is a scalar multiplication product $\pi_I = \Pi_{i \in I} p_i$, wherein $p_i$ is the prime number corresponding to the i-th block, and wherein $p_i$ is a number co-prime to a secret obtained by multiplying a first quantity consisting of the first large prime number minus one times a second quantity consisting of the second large prime number minus one.

20. The system as recited in claim 19, further comprising a client-side DRM module, wherein the client-side DRM module derives the decryption key for each block in the collection of blocks from the single DRM decryption secret by calculating $k_i = s_I^{\pi_I}/p^i \mod(n)$, wherein $k_i$ is the content encryption key for the i-th block.

\* \* \* \* \*

UNITED STATES PATENT AND TRADEMARK OFFICE
CERTIFICATE OF CORRECTION

PATENT NO. : 7,978,848 B2  
APPLICATION NO. : 11/621445  
DATED : July 12, 2011  
INVENTOR(S) : Zhu et al.

Page 1 of 1

It is certified that error appears in the above-identified patent and that said Letters Patent is hereby corrected as shown below:

In column 12, line 11, in Claim 7, delete "$k_i$," and insert -- $k_i$ --, therefor.

In column 12, line 17, in Claim 7, delete "$p_i$," and insert -- $p_i$ --, therefor.

In column 12, line 22, in Claim 8, delete "$s_I$," and insert -- $s_I$ --, therefor.

In column 12, line 25, in Claim 8, delete "$p_i$," and insert -- $p_i$ --, therefor.

In column 12, line 30, in Claim 9, delete "$k_i$," and insert -- $k_i$ --, therefor.

In column 14, line 29, in Claim 19, delete "$s_I$," and insert -- $s_I$ --, therefor.

In column 14, line 32, in Claim 19, delete "$p_i$," and insert -- $p_i$ --, therefor.

Signed and Sealed this  
Thirteenth Day of September, 2011

David J. Kappos  
*Director of the United States Patent and Trademark Office*